INJECTION-ELECTROLUMINESCENT DEVICE WITH GRADED HETEROJUNCTIONS AND METHOD OF MANUFACTURING SUCH DEVICES

Filed Aug. 24, 1967

WITNESSES:

Helen M. Farkas

James F. Young

INVENTOR

Willi Lehmann

BY

D. S. Buleza

AGENT

United States Patent Office
3,510,715
Patented May 5, 1970

3,510,715
INJECTION-ELECTROLUMINESCENT DEVICE WITH GRADED HETEROJUNCTIONS AND METHOD OF MANUFACTURING SUCH DEVICES

Willi Lehmann, Murrysville, Pa., assignor to Westinghouse Electric Corporation, Pittsburgh, Pa., a corporation of Pennsylvania Filed Aug. 24, 1967, Ser. No. 662,958
Int. Cl. H01j 1/62, 63/04
U.S. Cl. 313—108 18 Claims

ABSTRACT OF THE DISCLOSURE

Visible recombination radiation is generated by injecting holes and electrons into a layer of luminescent ZnSe (or a ZnS-ZnSe composite) from thin films of p-type ZnTe and n-type CdS disposed on opposite sides of the ZnSe layer. The semiconductor films are partially interdiffused with the ZnSe layer to provide graded heterojunctions and sloped band gaps which facilitate the injection of the holes and electrons. The heterojunctions are of predetermined thickness (approximately 0.1 to 1 micron) and are formed in situ by vapor deposition in a vacuum. The thickness of the junctions is controlled by concurrently heating the substrate to a temperature of from 300° C. to 600° C. for from several minutes to several hours, by heating the substrate after the vapor-deposition operation, or by varying the rates at which the materials are vaporized and condensed to effect a gradual transition from one material to the other in the juncture regions.

BACKGROUND OF THE INVENTION

This invention relates to the art of producing light and has particular reference to an injection-electroluminescent device that generates recombination radiation in the visible portion of the spectrum, and to methods for fabricating such devices.

Injection electroluminescence is the generation of light or other forms of radiant energy by the recombination of charge carriers of opposite conductivity (viz, electrons and holes) within a luminescent material or so-called "phosphor." The radiation is produced when the electrons and holes recombine across the energy band gap in the phosphor, either directly or through recombination centers.

Injection electroluminescence can be achieved by introducing (1) holes into an n-type conducting material, (2) electrons into a p-type conducting material, or (3) both electrons and holes into an originally insulating or near-insulating luminescent material. Injection-electroluminescent devices are potentially very efficient light sources but have not been commercialized since efficient emission in the visible region at room temperature has heretofore not been achieved. One of the main problems is the availability of a material which is an efficient luminescent material and can be combined with semiconductor materials to achieve one of the three modes of injection mentioned above.

There are, for example, many materials which are good semiconductors and can easily be made into p-n or p-i-n junctions but which are poor phosphors. Examples are SiC and GaP. Other materials, such as GaAs, can also be made into such junctions and are good phosphors but emit in the infrared region, or require low temperature for efficient emission.

There are, on the other hand, excellent phosphors such as ZnS and ZnSe which have heretofore been impractical for use in injection-electroluminescent devices because of the difficulty involved in incorporating them into p-n or p-i-n junctions and efficiently injecting charge carriers and effecting recombination radiation. Various means of injecting minority carriers into such materials have been proposed and tried but have been found to be impractical mainly due to the high rate of majority carrier extraction and the resultant drop in efficiency. Carrier extraction occurs when charge carriers that are introduced into the phosphor through one junction flow out of the phosphor through the other junction without recombining with a carrier of the opposite type. Carrier extraction thus drastically reduces the efficiency of the device because it consumes electrical energy without contributing to the light emission.

One approach to the aforesaid problems has been to simultaneously inject electron and holes into opposite sides of such phosphors through thin films of insulating material by means of the so-called "tunneling" effect. An injection-electroluminescent device utilizing such "tunnelable" insulator layers is disclosed and claimed in U.S. Pat. No. 3,267,317, issued Aug. 16, 1966, to A. G. Fischer.

In an article entitled, "Injection Electroluminesence" (Solid-State Electronics, vol. 2, Pergamon Press, 1961, pp. 232–246), Fischer discusses various theories and problems in the injection-electroluminescent art and suggests the use of graded junctions or "reduced-band-gap contacts" in a p-i-n structure to introduce both holes and electrons into a thick i-layer of luminescent material. However, he does not disclose how to much such a device or give the combination of materials which will provide such an arrangement and can be joined with the required graded junctions. Fischer, in the same article, suggests another theoretical device utilizing a layer of luminescent ZnSe:Ag, Al with a layer of indium oxide on one side and a layer of ZnTe on the other. Only the ZnTe is joined to the ZnSe by a graded junction to provide a structure having a "reduced-gap anode." Once again, no suggestions as to how to make the device or graded junction are given, nor is any information presented as regards the precise structure of the "reduced-gap" contact and the graded junction.

SUMMARY OF THE INVENTION

It is accordingly the general object of the present invention to provide a practical injection-electroluminescent device that will overcome the foregoing and other problems of the prior art and efficiently produce recombination radiation at room temperature.

Another and more specific object is the provision of such a solid-state device wherein the simultaneous injection of the charge carriers and the production of light at commercially feasible efficiency levels are achieved by a novel combination of materials that are inherently adapted to be electronically coupled together in the required manner.

Still another object is the provision of commercially feasible methods for fabricating the various elements and interconnecting junctions employed in such solid-state devices.

The foregoing objects and other advantages are achieved in accordance with the present invention by combining a layer of insulating and luminescent material with p-type and n-type semiconductor materials which are both miscible or soluble with the luminescent material and permit the materials to interdiffuse into each other and form graded junctions between the respective components of the p-i-n structure. ZnSe (or a composite of interdiffused layers of ZnS and ZnSe) comprises the luminescent core element of the p-i-n sandwich, and n-type CdS and p-type ZnTe films comprise the outer elements. The adjacent layers of the p-i-n sandwich are highly soluble with each other and are interdiffused so as to provide graded heterojunctions between each of the various elements or layers. Insulating CdS and an electrode such as tin oxide, indium oxide, or titanium dioxide that is capable of injecting electrons into the i-type CdS can be used in place of n-type CdS. The thickness of the CdS layer 14 is approximately 2 microns.

The problem of carrier extraction and the resultant decrease in efficiency is eliminated insofar as the ZnSe (or ZnS-ZnSe composite) initially does not contain any free electrons or holes which can be extracted. The injection of holes and electrons into opposite sides of the luminescent core element is achieved directly through graded heterojunctions without any intervening insulating layer and without the need of any tunneling, thus avoiding the loss of charge carriers and the complexity of such intervening components. The use of graded heterojunctions between each of the elements of the device provides sloped rather than stepped edges at the ends of both the conduction and valence bands and thus permits the electrons and holes to be injected with a proportionately lower voltage or forward bias.

Various methods for concurrently depositing the ZnSe, ZnS and ZnTe layers and forming the graded heterojunctions in situ are provided. In general, these methods involve controlling the temperature of the substrate during or after vapor-deposition of the compounds, or controlling the rate at which the compounds are vaporized and condensed.

BRIEF DESCRIPTION OF THE DRAWING

A better understanding of the invention will be obtained by referring to the accompanying drawing, wherein.

While the invention is specially adapted for use in conjunction with solid-state devices for generating visible radiations, it can also be used with advantage in devices or junctions that emit in the infrared portions of the spectrum.

DESCRIPTION OF THE PREFERRED EMBODIMENTS

Figure 1:
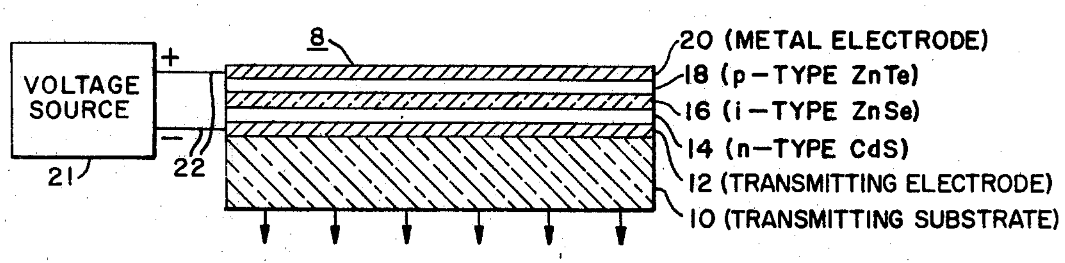
FIG. 1 is an enlarged sectional view of an injection-electroluminescent device embodying the present invention utilizing superimposed interdiffused layers of ZnTe, ZnSe and CdS in p-i-n configuration.

In FIG. 1, there is shown an injection-electroluminescent device 8 which embodies the invention and consists of a light-transmitting substrate 10 such as a conductive glass plate that is coated with a light-transmitting film of tin oxide or the like which serves as the transmitting electrode 12. Overlying the transmitting electrode 12 is a layer 14 of n-type CdS which, together with superimposed layers 16 and 18 of insulating (or approximately insulating) ZnSe and p-type ZnTe, respectively, form a p-i-n sandwich or laminate.

A metal electrode 20 is applied over the p-type ZnTe layer 18. The device 8 is energized by connecting the electrodes 12 and 20 to a suitable voltage source 21 by a pair of lead wires 22. When the electrode 20 is positive with respect to the electrode 12, as indicated in FIG. 1, the p-i-n sandwich formed by the superimposed layers 14, 16, and 18 is biased in a forward direction. This causes holes from the p-type ZnTe and electrons from the n-type CdS to be injected into opposite sides of the luminescent ZnSe layer 16 and to recombine within the phosphor crystals. The resultant visible recombination radiations pass through the transmitting electrode 12 and substrate 10 and out of the device 8, as indicated by the arrows in FIG. 1.

The CdS layer 14 is made n-type conductive by the inclusion of a suitable donor impurity such as In, Al, Ga, Cl, Br, I, Sc or any of the rare earths. Excellent results have been achieved with from 0.01% to 1% by weight of In and 0.1% by weight In is preferred.

The ZnTe layer 18 is rendered p-type conductive by a suitable acceptor impurity such as P, Li, Na, K, Rb and Cs. About 0.1% by weight of P in a film of ZnTe approximately 2 microns thick provides a conductivity of approximately $10^{-2}$ (ohm×cm.)$^{-1}$ and has given good results. However, tests have shown that the conductivity and reproducibility of ZnTe films formed by vacuum-vaporization techniques are materially improved by utilizing an alkali metal as the acceptor impurity. Potassium is preferred and when 0.1% by weight is used in the charge it provides a ZnTe film having a p-type conductivity in the order to 0.1 (ohm×cm.)$^{-1}$. The potassium in the charge to be vaporized can be varied from 0.01% to 1% by weight.

The intermediate layer 16 of luminescent ZnSe is preferably a thin film (approximately 1 micron thick) so as to facilitate the recombination of the injected electrons and holes and minimize or eliminate the presence of space charges produced by trapped carriers. The body of luminescent ZnSe can also comprise a single crystal having a thickness in the order of $10^{-4}$ cm. or 1 micron.

In accordance with the invention, the efficient injection of holes and electrons into the body of luminescent material is achieved by making the p-type, i-type and n-type components from Class II–VI compounds that are soluble or miscible with one another and thus permits the formation of graded heterojunctions between the adjacent elements of the p-i-n sandwich. This requirement is met in the device 8 shown in FIG. 1 since the intermediate layer 16 of luminescent ZnSe is highly soluble with both CdS and ZnTe.

The term "graded heterojunction" as used herein and in the appended claims means a region between two adjacent bodies or layers of material in which the materials are interdiffused and provide a gradual transition from one material to the other. The transition between the CdS and ZnSe on one side of the p-i-n sandwich of the device 8, and between ZnSe and ZnTe on the other side of the sandwich are thus not abrupt but are smooth. The band edges in the junction regions are accordingly sloped, thus eliminating the steep or abrupt potential step which must be overcome before carrier injection occurs. The tapered or sloped band edges provide a "pathway" on each side of the luminescent body that guides electrons from the CdS into the conduction band of the ZnSe, and guide holes from the ZnTe into the valence band of the ZnSe.

Figure 2:
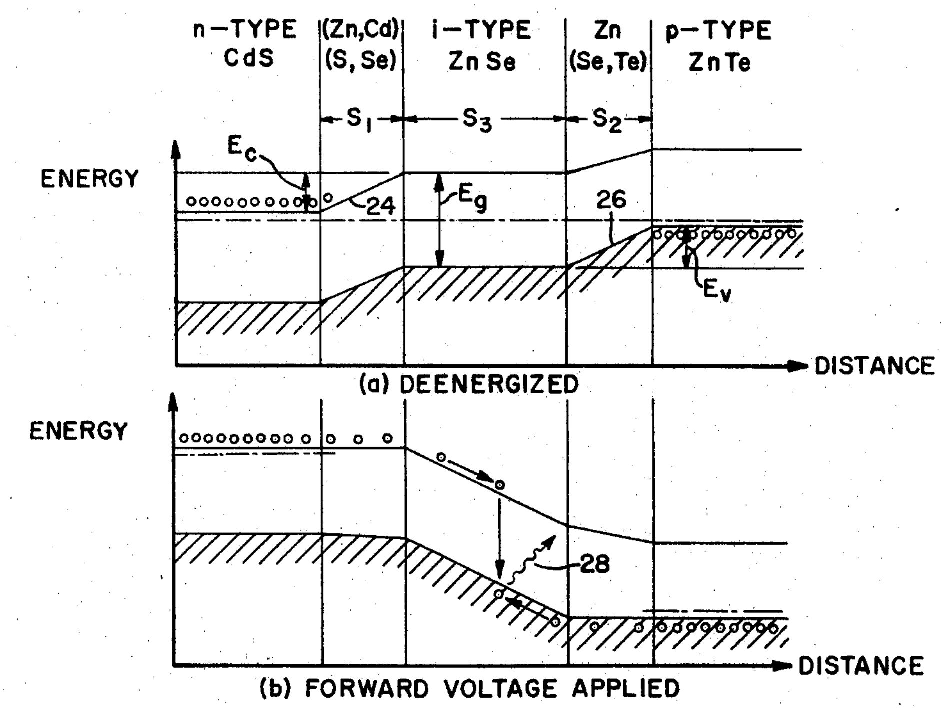
FIGS. 2(*a*) and (*b*) are the energy band diagrams of the aforesaid device when in the deenergized and energized states, respectively.

The aforementioned sloped band edges and pathways provided by the graded heterojunctions of the present invention are illustrated in the energy band diagram depicted in FIG. 2. The potential difference between the conduction band of the CdS and the conduction band of the ZnSe is denoted by $E_c$ and the potential difference between the valence band of the ZnTe and the valence band of the ZnSe by $E_v$. $E_g$ represents the band gap. As shown in FIG. 2(*a*), the graded heterojunctions provide a sloped pathway 24 from the CdS into the conduction band of the ZnSe, and another sloped pathway 26 from the ZnTe into the valence band of the ZnSe.

In order to inject the electrons and holes into the ZnSe it is accordingly only necessary to apply an electric field or forward bias of sufficient strength to counteract or cancel out the slope of the conduction and valence bands between the respective materials.

When this is done, as shown in FIG. 2(*b*), free electrons simply slide along the lower edge of the conduction band from the n-type CdS into the insulating and luminescent ZnSe, and free holes slide along the top edge of the valence band from the p-type ZnTe into the ZnSe. Electrons and holes are thus simultaneously injected into the ZnSe where they recombine and produce visible radiation, as indicated by the arrow 28.

The thickness $S_1$ and $S_2$ (FIG. 2(*a*)) of the graded heterojunctions relative to one another and to the thickness $S_3$ of the noninterdiffused portion of the ZnSe layer 16 are important since they control the rate with which the holes and electrons are injected into the luminescent body of ZnSe. It has been found that the thickness of the graded junctions should be approximately equal to each other and in the order of 0.1 to 1 micron and the thickness ($S_3$) of the nondiffused or unadulterated portion of the ZnSe layer 16 should be about 1 micron. Optimum results are achieved when the thickness of each of the graded junctions is at least 10% of the thickness of the nondiffused portion of the ZnSe layer. The graded heterojunctions should be as thick as practical since the thicker the junction the shallower the slope of the band edges and the lower the electric field strength required to inject the charge carriers into the luminescent material.

METHOD OF MANUFACTURING AND CONTROLLING THE THICKNESS OF THE GRADED HETEROJUNCTIONS

The preferred method of fabricating the device 8 shown in FIG. 1 is to deposit the various layers of materials on the substrate 10 of conducting glass by standard vacuum-vaporization techniques. The conducting glass, which is commercially available and coated with a light transmitting film 12 of tin oxide or the like, is placed within a suitable hollow heating manifold together with a crucible of tantalum or the like, and this entire assembly is placed within a vacuum chamber. The crucible is loaded with a charge of the material to be deposited. The charge preferably consists of pressed pellets of prefired powdered compounds containing predetermined amounts of the donor or acceptor impurities.

The vacuum chamber is then evacuated until a pressure in the order of $10^{-5}$ torr is obtained. The glass substrate is then heated to a temperature of between 300 and 500° C. and maintained at such temperature while the crucible is heated and the charge is vaporized and condensed on the tin-oxide coated surface of the substrate. This process is repeated until the various layers 14, 16 and 18 are deposited one over the other. The last step in the process consists of depositing a final layer of a suitable vaporized metal such as aluminum, nickel or gold which serves as a metal electrode 20.

If desirable, a plurality of crucibles, one for each of the compounds to be deposited, can be provided along with separately controlled heating means so that the various layers can be vaporized and condensed successively without breaking the vacuum to recharge the apparatus.

It has been found that the thickness of the film can be controlled by placing a weighed amount of the compound into the crucible. For example, in the case of a glass substrate placed about 10 cm. over the top opening of the crucible, 100 milligrams of ZnSe when completely evaporated provides a film having a thickness of $1.0\pm0.1$ micron.

It has also been found that the thickness of the graded heterojunctions can be controlled by heating the coated substrate to a predetermined temperature either during, or after, the deposition of the various compounds and maintaining it as such temperature for a predetermined period of time. The higher the heating temperature and the longer the heating time, the greater the degree of interdiffusion of the materials comprising the various layers and the shallower the slopes of the band edges in the junction. As a specific example, it has been discovered that a graded heterojunction between CdS and ZnS in the order of 0.1 micron thick is obtained if the coated substrate is heated to 500° C. for 1 hour, and that the thickness of the junction will increase to approximately 0.2 micron if the substrate is held at this temperature for approximately 16 hours.

The thickness of the graded heterojunctions can also be controlled by controlling the evaporation rates of the various compounds during the vacuum deposition process. For example, n-type conducting CdS is vaporized and condensed on a conducting glass substrate until the desired layer thickness is obtained, then the rate of CdS evaporation is gradually reduced, as for example by reducing the temperature of the crucible containing the CdS pellets, while the rate of ZnSe evaporation is initiated and gradually increased until only the latter is being vaporized and condensed. This same procedure can be used to form the graded junction between the p-type conductive ZnTe and the quasi-insulating ZnSe. As a specific example, the crucible containing the CdS charge is heated to a temperature of approximately 800° C. to 1000° C. for 1 to 5 minutes to build up a layer of condensed CdS of a certain thickness, and then the crucible temperature is gradually reduced to below 700° C. while the temperature of another crucible containing ZnSe is concurrently gradually increased to approximately 1000° C. (at which ZnSe begins to vaporize), and then to 1300° C., at which temperature the ZnSe rapidly vaporizes.

The controlled variation of the vaporization and deposition rates of the various materials can also be achieved by means of a single crucible that contains weighed charges of a plurality of the compounds to be deposited, and successively vaporizing and depositing the compounds by gradually increasing the temperature of the crucible to and beyond the various vaporization temperatures of the materials. For example, CdS will vaporize first at about 800° C. and, if ZnSe, is the other compound, both materials will be vaporized at a temperature of 1000° C., and finally only ZnSe will be vaporized at a temperature of 1200° C. Superimposed thin films of CdS and ZnS having a graded heterojunction of predetermined thickness will thus be formed.

ALTERNATIVE EMBODIMENTS

Tests have shown that holes have a lower mobility than electrons and are more apt to be trapped within the luminescent material. In order to achieve optimum efficiency, the rates of hole and electron injection should be as balanced as possible. It has been discovered that the rate at which electrons are injected can be reduced to the desired level by utilizing a layer of insulating CdS (rather than n-type CdS) in combination with a light-transmitting electrode of tin oxide or the like that will inject electrons into CdS but not into ZnS or ZnSe, or at least at a much lower rate.

Figure 3:
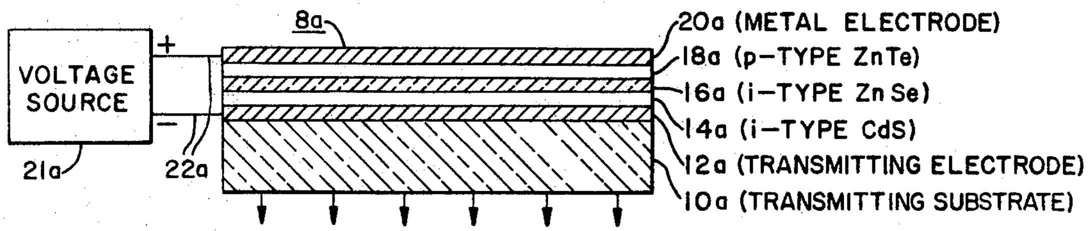
FIGS. 3 to 5 are alternative embodiments wherein i-type CdS and an electron-injecting electrode are substituted for n-type CdS, and interdiffused ZnS-ZnSe layers are used as the i-core element.

In device 8*a* shown in FIG. 3 embodies this modification and accordingly consists of the light transmitting substrate 10*a* and the following superimposed layers arranged in the order in which they are listed: a light-transmitting electrode 12*a* of SnOx; a thin film 14*a* of insulating or quasi-insulating CdS; a thin film 16*a* of insulating ZnSe; a thin film 18*a* of p-type ZnTe, and finally a metal electrode 20*a* of vaporized aluminum, gold or the like. The p-i-n components are joined to each other by graded heterojunctions in the same manner as discussed in connection with the embodiment illustrated in FIG. 1. Indium oxide or titanium dioxide can also be used in place of tin oxide.

Figure 4:
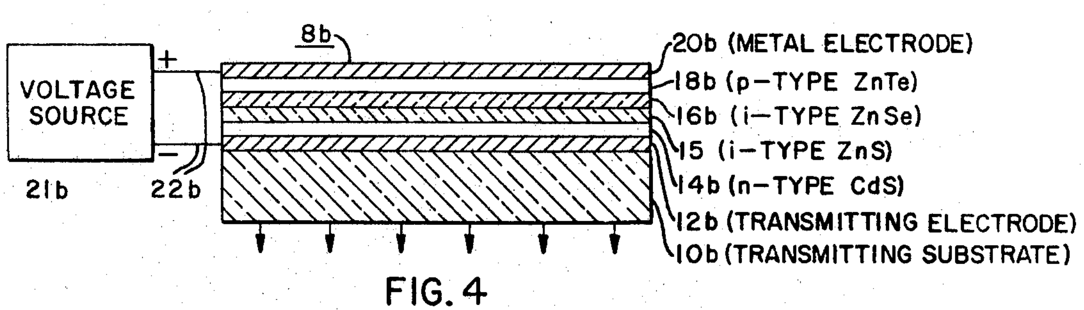

Since ZnS is soluble with both CdS and ZnSe, a layer of luminescent ZnS can be interposed between the n-type CdS layer and insulating luminescent ZnSe layer in the embodiment shown in FIG. 1. This modification is illustrated in FIG. 4. The modified device 8*b* is identical with the FIG. 1 embodiment with the exception that a layer 15 of insulating and luminescent ZnS is interposed between the layers 14*b* and 16*b* of CdS and ZnSe, respectively, and is joined to the latter by graded heterojunctions.

Figure 5:
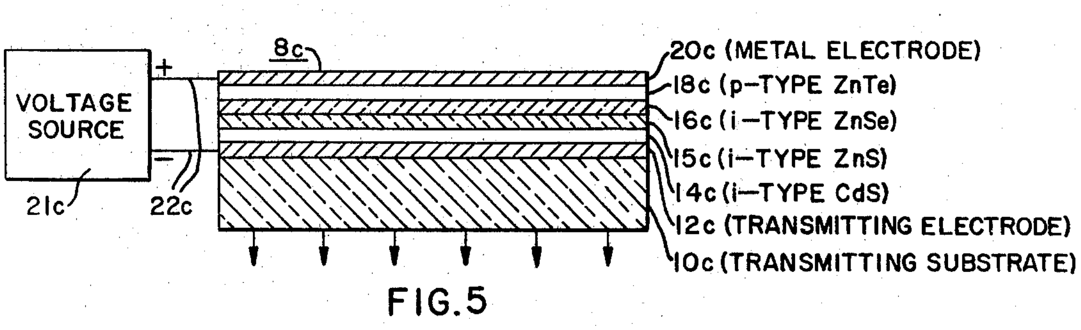

In FIG. 5 there is shown another injection-electroluminescent device 8c which incorporates both of the modifications illustrated in FIGS. 3 and 4. The device 8c accordingly consists of the glass substrate 10c, a conductive coating 12c of tin oxide (or indium oxide or titanium dioxide) which injects electrons into the adjacent layer 14c of insulating CdS at a predetermined rate, and overlying layers 15c and 16c of luminescent i-type ZnS and ZnSe, respectively, and finally a layer 18c of p-type ZnTe and a metal electrode 20c.

It will be appreciated from the foregoing that the objects of the invention have been achieved in that an injection-electroluminescent device has been provided which will efficiently produce visible recombination-radiation at room temperature. Various methods for fabricating the various layers of the device and controlling, in situ, the thicknesses of both the layers and interconnecting graded heterojunctions have also been provided.

While several embodiments and modes of manufacture have been described, it will be apparent that various modifications can be made without departing from the spirit and scope of the invention. For example, a layer of admixed ZnS and ZnSe in combination with a separate layer of ZnS can be substituted for the single ZnSe layer or the composite formed by the ZnS and ZnSe layers, providing at least 90% by weight of ZnSe is present in the region where the layer of admixed ZnS-ZnSe is joined to the ZnTe. This is necessary in order to obtain interdiffusion of ZnSe and ZnTe and a graded heterojunction. Thus, ZnS and ZnSe can be combined in various ways to provide the luminescent body that is used as the i-core component of the p-i-n structure.

I claim as my invention:

1. An injection-electroluminescent device for generating visible radiation by the recombination of charge carriers comprising, in combination;
- a body of p-type conductive ZnTe,
- a body of CdS,
- a body of luminescent insulating material selected from the group consisting of ZnSe and a combination of ZnSe and ZnS disposed between said bodies of ZnTe and CdS and coupled thereto by graded heterojunctions.

2. The device set forth in claim 1 wherein said body of CcdS is n-type conductive.

3. The device set forth in claim 1 wherein; said body of CdS is intially devoid of charge carriers, and an exterior source of electrons is disposed in contact with said body of CdS and is adapted to inject electrons into the CdS and render the latter n-type conductive only when the device is energized.

4. The device set forth in claim 3 wherein said exterior electron source comprises a layer that is composed of a semiconductive material selected from the group consisting of tin oxide, indium oxide, and titanium dioxide and is in contact with the outer surface of said body of CdS.

5. The device set forth in claim 4 wherein said semiconductive material is light transmissive and constitutes one of the device electrodes.

6. The device set forth in claim 1 werein said bodies of ZnTe, CdS and luminescent material comprise thin films of predetermined thickness.

7. The device set forth in claim 6 wherein said film of luminescent insulating material comprises ZnSe and said graded heterojunctions thus comprise regions of interdiffused ZnTe-ZnSe and CdS-ZnSe.

8. The device set forth in claim 6 wherein:
- said film of liminescent material comprises a layer of ZnSe and an overlying layer of ZnS that are interdiffused and thus joined by a graded heterojunction,
- said CdS film is in contact with and joined to the outwardly-disposed face of said layer of ZnS by a graded heterojunction, and
- the ZnTe film is in contact with and joined to the outwardly-disposed face of said ZnSe by a graded heterojunction.

9. The device set forth in claim 6 wherein;
- the graded heterojunctions joining said ZnTe and CdS films to said film of luminescent material are of approximately equal thickness, and
- the thickness of each of the aforesaid junctions is at least 10% of the thickness of the noninterdiffused portion of the film of luminescent material.

10. The device set forth in claim 6 wherein said ZnTe and CdS films are each approximately 2 microns thick.

11. The device set forth in claim 6 wherein said film of CdS is n-type conductive and contains a predetermined amount of a donor impurity selected from the group consisting of In, Al, Ga, Cl, Br, I, and Sc.

12. The device set forth in claim 6 wherein said film of ZnTe is rendered p-type conductive by a predetermined amount of an acceptor impurity selected from the group consisting of P, Li, Na, K, Rb and Cs.

13. The device set forth in claim 6 wherein;
- said film CdS is n-type conductive and contains a predetermined amount of In which is included as a donor impurity, and
- said film of ZnTe is rendered p-type conductive by a predetermined amount of K which is included as an acceptor impurity.

14. The device set forth in claim 13 wherein;
- said n-type conductive CdS contains from 0.01% to 1% by weight In, and
- said p-type conductive ZnTe contains from 0.01% to 1% by weight K.

15. In the manufacture of an injection-electroluminescent device having (a) a core element comprising a body of luminescent material selected from the group consisting of ZnSe and a combination of ZnSe and ZnS, and (b) a body of CdS and a body of p-type conductive ZnTe disposed on opposite surfaces of said core element, the method of fabricating said core element and overlying bodies of CdS and n-type conductive ZnTe and producing graded heterojunctions of predetermined thicknesses therebetween, which method comprises:
- successively evaporating and condensing the respective materials in a vacuum to form said core member and overlying bodies in situ, and
- heating the resulting laminated component to a predetermined temperature for a predetermined period of time to cause the respective materials to interdiffuse and form graded heterojunctions of predetermined thickness.

16. The method set forth in claim 15 wherein said laminated component is heated to a predetermined temperature and maintained at said temperature for a predetermined period of time after the vapor-deposition operation is completed.

17. In the manufacture of an injection-electroluminescent device having (a) a core element comprising a body of luminescent material selected from the group consisting of ZnSe and a combination of ZnSe and ZnS, and (b) a body of CdS and a body of p-type conductive ZnTe disposed on opposite surfaces of said core assembly, the method of fabricating said core element and overlying bodies of CdS and p-type conductive ZnTe and producing graded heterojunctions of predetermined thicknesses therebetween, which method comprises:
- successively evaporating and condensing the respective materials at controlled rates in a vacuum to form said core element and overlying bodies in situ, and
- concurrently varying the rates at which the respective materials are evaporated to effect a gradual and controlled transition from one body of condensed material to the adjacent body of condensed material and thereby form a graded heterojunction of predetermined thickness between said adjacent bodies of material.

18. The method of claim 15 wherein the thicknesses of the graded heterojunctions are controlled by vapor-depositing the respective materials on a substrate which is heated to and maintained at a predetermined temperature during the vapor-deposition operation.

References Cited

UNITED STATES PATENTS

| | | | |
|---|---|---|---|
| 2,938,136 | 5/1960 | Fischer | 313—108 |
| 3,018,426 | 1/1962 | Ruppel | 317—237 |
| 3,196,327 | 7/1965 | Dickson | 317—234 |
| 3,267,317 | 8/1966 | Fischer | 313—108 |

OTHER REFERENCES

Fischer: "Injection Electroluminescence," Solid State Electronics, Pergamon Press, 1961, vol. 2, pp. 232–246.

JAMES W. LAWRENCE, Primary Examiner

D. O'REILLY, Assistant Examiner

U.S. Cl. X.R.

317—235; 148—174